Aug. 25, 1959     J. H. FORKNER     2,901,359

DRIED APPLE AND PROCESS FOR PREPARING

Filed Dec. 15, 1955

INVENTOR.

John H. Forkner

BY Williamson, Schroeder, Adams & Meyers

ATTORNEYS

United States Patent Office 2,901,359
Patented Aug. 25, 1959

2,901,359

DRIED APPLE AND PROCESS FOR PREPARING

John H. Forkner, Fresno, Calif., assignor to The Pillsbury Company, a corporation of Delaware Application December 15, 1955, Serial No. 553,313

6 Claims. (Cl. 99—204)

This invention relates to the drying of fruit, and more particularly to a dried fresh apple product retaining piece structure, and a process therefor.

Certain fruits, such as apples, peaches and apricots, have a high moisture content and are readily oxidized. When the outer skin is removed from such fruits, discoloration may begin to show in a matter of several minutes. Furthermore, chemical changes take place in a cut or bruised piece of fruit of the class described and bacterial action can easily start when the flesh of the fruit is thus exposed or crushed. The oxidation and chemical action proceeds at a much slower rate when the moisture content is reduced, but there is no process, to my knowledge, which is rapid enough to dry the fruit before some oxidation can occur. It has, therefore, become the practice to preserve the fruit simultaneously with the drying operation. A necessary evil attendant with conventional drying of pieces of apple and the like resides in the tough layer which is formed at the outer surface of the exposed flesh, the tough layer being partially due to the action of the preserving medium and partially due to the natural collapse of cells at the outer surface during the drying process.

Dried apples are a standard article of commerce and are made by peeling apples, coring them, slicing, then immersing them in a sodium bisulphite solution, following which they are dried in a conventional apple kiln or conventional conveyor belt dryer duplicating kiln drying effects. The ordinary kiln is generally a room with openings in the floor provided with heat ducts. The apples are spread out on the floor a foot or so thick. Heated forced air is sent through the apple pieces from the floor of the kiln. Periodically through the operation, the apples are stirred manually with a shovel. When the product has been dried to approximately an 18% moisture level, it is then removed from the drier, surface moistened to a total moisture level of about 25%, and then resulphured. This product constitutes what is known to the trade as "dried apples." Although it is possible to kiln-dry the apples or to dry by continuous conveyor belt technique below 18% moisture, the drying time becomes considerably longer. The additional drying time is due to the progressively increased toughening or case hardening effect caused by the sulphuring solution and collapse of cellular structure as previously noted.

Another type of dried apple has been developed and is used by institutions, bakers, armed forces and the like, and is preliminarily treated in the same manner as above described, including an initial kiln-drying or equivalent drying coupled with sulphuring. The main drying operation is conducted in a vacuum-type drier. Subjecting partially dried apples to final dehydration under vacuum keeps the cellular structure more open and assists in evening out the transfer of moisture from the innermost portion of the apple piece to the outer surface. Vacuum-drying permits evaporation to be carried out at a lower temperature. The vacuum-drying process, however, is more expensive, and, although it does not aggrevate case hardening, it does not eliminate the case hardening of the sulphured apple piece either, and the tough layer formed on the outside of the piece still remains a problem in dehydration and ultimate rehydration.

In the use of a dried apple product, the case hardening effect which is a problem in the drying of the apple also causes trouble when it is desired to rehydrate the dried apple. In conventional practice for rehydrating dried apples for pie fillings, it is recommended that the bakers soak the apples for twelve hours and then keep them for one-half hour at 180 degrees Farenheit. The product then must cool for four hours in order to simulate fresh apples. It has been attempted to accelerate the rehydration time by slicing apples thinner. Unfortunately, the thin slices pack too closely together and prevent the proper penetration of air during the initial drying process. Also, since there is greater surface exposed, the relative quantities of sulphuring medium which is absorbed by the apple piece is greater.

It is a general object of this invention to provide a dried apple product or the like, of piece structure which will possess enhanced dehydrating and rehydrating properties and to a process of manufacture therefor.

Another object of the invention is to provide a dried fruit particle and method of making such particle with a surface area and configuration relative to its density so as to accentuate its suspensibility in a food product.

A further object of my invention is to so treat dried apples as to create a new dried apple product both with respect to its utilization and its appearance.

A still further object of the invention is to provide a dried apple piece product which will be capable of so hydrating when incorporated directly in a moist prepared food as to retain a discrete and flavorsome entity while becoming pleasantly eatable in character.

These and other objects and advantages will more fully appear from the following description, made in connection with the accompanying drawings wherein like reference characters refer to the same parts throughout the several views and in which.

Figure 1:
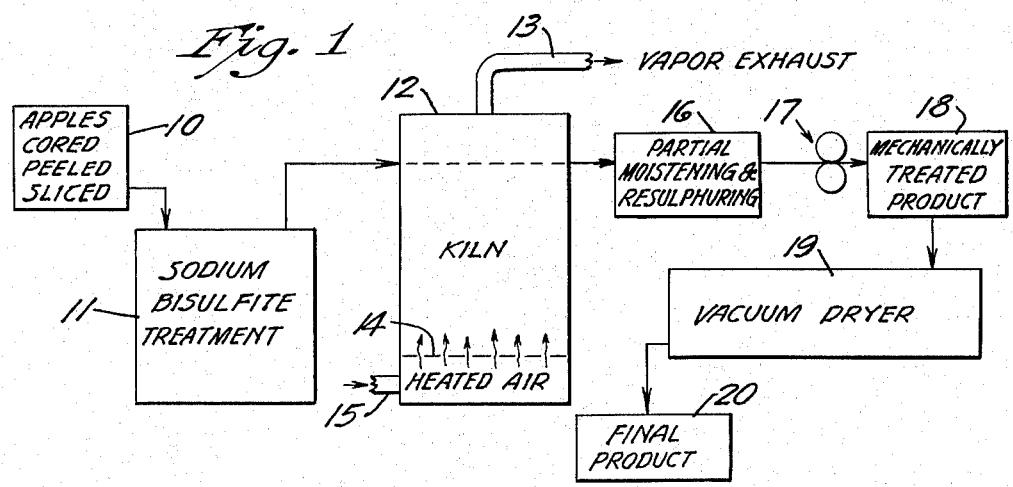
Figure 1 is a diagrammatic representation of my process for making dried apple products coupled with a final vacuum-drying operation.

Referring to the diagrammatic flow sheet of Fig. 1, block number 10 represents prepared apple pieces which are cored, peeled and sliced in accordance with conventional practice or may even be considerably thicker or thinner than the pieces normally utilized for the production of conventional dried apples. Usually, the thicknesses of the apple pieces range from ⅛ of an inch to ½ of an inch. These apple pieces in their freshly cut condition have about 85% moisture and are subject to rapid oxidation or enzymic browning at the outer surface. This browning is to be avoided as much as possible and, for that purpose, the apple pieces are immediately treated with the preserving and anti-oxidizing medium.

Box 11 in Fig. 1 indicates treatment with a preservative and anti-oxidant. The established technique is to quickly submerge the cored sliced apples into a batch of dilute sodium bisulphite.

The sulphured apple pieces are then placed in a kiln 12 vented at the top with a vapor exhaust 13 and having a perforate floor 14 through which heated air fed through duct 15 can pass upwardly through the apple layer. The air temperature may be as high as 170 degrees Fahrenheit, but usually is maintained at around 160 degrees Fahrenheit. The drying period may vary depending on the resistance to evaporation which is characteristic of the particular type of apple used but usually amounts to around twenty-four hours. Periodically through this drying period the apples are turned over on the floor by manual means such as a shovel. One conventional practice is to carry down the drying operation until about 18% of the apple remains as moisture. While these apple pieces are warm, they are still soft and pliable, but a considerable case hardening effect has been imparted to each piece. When the pieces cool, they become quite tough and leathery. Since much of the sulphuring medium has been lost through the drying operation, it is usual practice to resulphur the product at this point. It is common practice to place the apples on trays and subject them in an enclosed room to burning sulphur fumes. The active sulphuring medium and the moisture on the surface of the apple piece permits the vapor to dissolve and permeate the surface and prevent enzymic browning during the subsequent drying process and thereafter to preserve the fruit. This resulphuring process brings the total moisture content of the dried apple piece back to around 25% moisture, and this product, designated at box 16 of Fig. 1, is what is known in the trade as dried apple. The leathery, tough layer which is formed on the outer flesh surface of the cut apple piece is considered a necessary evil. It is resistant both to the passage of vapor outwardly during the drying process and also is resistant to rehydration as pointed out above.

In my process as disclosed in the flow sheet of Fig. 1, the resulphuring treatment, under some circumstances, is omitted and the dried apple pieces which are taken from the kiln are then utilized by me directly for further processing. In this form of my invention, there is no, or a minimum of, remoistening.

It is desirable in the several forms of my process invention that before application of the next-to-be described mechanical treatment of the apple piece, preparing of the piece be accomplished to a moisture level below 35% of the weight of the dried piece.

An important feature of my invention is mechanical treatment of the previously dried apple piece so as to impart certain characteristics which will be set forth more in detail in this specification. The mechanical means by which my process is carried out constitutes a flattening and surface layer rupturing mechanism indicated generally at 17. I have found particularly useful a double roll mill in which heavy steel rollers are disposed with their axes parallel and their cylindrical surfaces spaced in accordance with the desired thickness of the rolled product. I have found that smooth rolls 30 inches wide and 18 inches in diameter, and each rotating at 24 r.p.m., function well for my purpose. The surface of the rolls may be corrugated, serrated, or provided with other irregularities and they may be caused to rotate at slightly different speeds. Whatever variants are employed in the mechanism for flattening the apple pieces, a two-fold action must occur to give these desired results. These are, first, a compressing or partial crushing of the inner cellular structure of the apple piece and, secondly, a tearing or rupturing of the outer tough layer formed at the cut flesh surface in a discontinuous manner to expose partially the inner cellular structure of the piece. It is not intended that the apple piece be broken up into severed fragments by this treatment, nor is it intended that the tough surface layer be separated from the inner cellular body. There are, however, definite and visible discontinuous breaks through the tough surface layer and the surface of the mechanically treated particle is noticeably more moist because of the exposure of the inner cellular body. The product treated in the foregoing manner is indicated by the box 18 in Fig. 1. At this stage, we have developed an improved dried apple product by the act of disrupting the tough surface layer which, under further drying, will more readily give up its moisture. The value of disrupting the tough surface layer and exposing the inner flesh is evident by the fact that we can utilize a shorter drying time under equivalent conditions or can dry for the same time at a lower temperature to retain more apple flavor in the product. I then directly vacuum-dry the mechanically treated product 18 and this is accomplished by transferring product 18 to the vacuum drier 19 which may be of a type conventionally employed for drying fruit. This final vacuum dried product is indicated at box 20 and, for commercial use, is generally dried to a moisture content of 5% or less. It is to be understood that other types of drying equipment such as a conveyor equipped with an agitator and warm circulated air may be usefully employed. I have successfully dried my product by the process of Fig. 1 to as low as 2% moisture.

Figure 3:
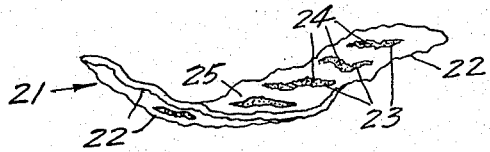
Figure 3 shows a characteristic piece of dried apple after having been treated according to my invention.

The spacing between rolls 17 is usually maintained at from 1/64 to 1/16 of an inch. The apple piece, of course, has a certain amount of natural resilience so that this thickness is not necessarily maintained through the drying operation and to the final product. The ultimate piece, however, is quite thin and has an appearance generally as shown in Fig. 3. The mechanical treatment results in a product having a greatly increased area over that of the original apple piece with but a fraction of the original thickness. The dried apple piece 21 is further characterized by its irregular and compound curvature. The edges 22 are scalloped and the broader areas have discontinuous breaks 23 disposed at random and exposing areas 24 of the inner cellular structure. The surface of the inner cellular structure 24 offers less resistance to the passage of moisture than the remaining case hardened surface layer 25.

Figure 2:
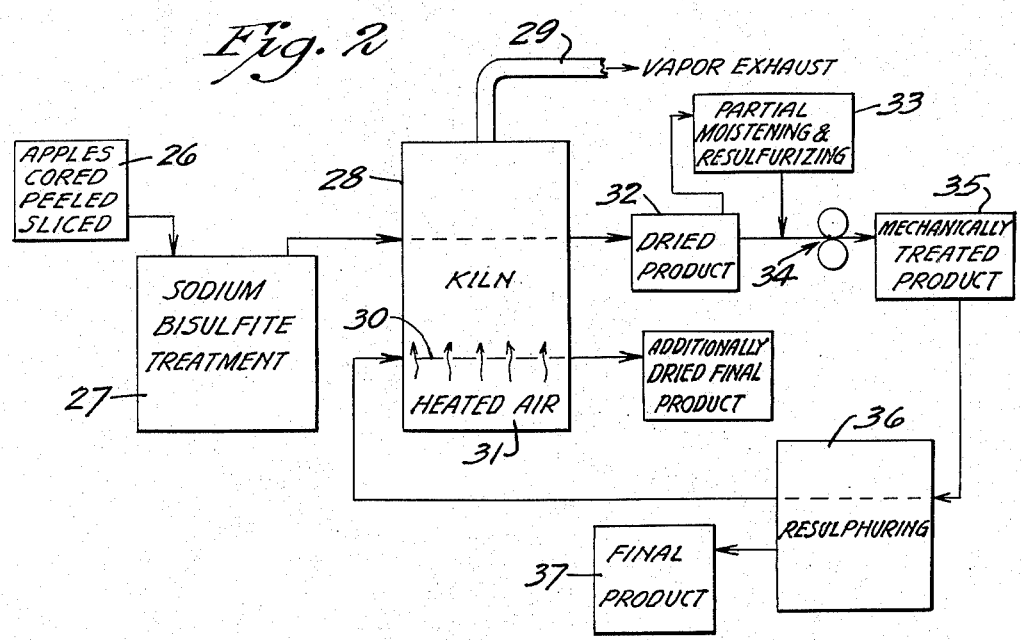
Figure 2 is a diagrammatic representation of another application of my invention wherein, after mechanical treatment, the dried apple product is resulphured.

Referring now to Fig. 2, I there show a diagrammatic representation or flow sheet of another form of my invention utilizing the same mechanical treatment as above described but resulphuring the treated product. My process may be usefully employed at various moisture levels. In the case of drying to a point above approximately 5%, I may use an alternate method in which resulphuring after the mechanical treatment becomes an important step. In the case of drying the product to below 5%, any resulphuring is undesirable since a large portion of the sulphuring medium is then vaporized during the drying process and such a dried product does not even require much sulphur for preservation. At higher moisture levels, the step of resulphuring is desirable. In my process disclosed in Fig. 2, the conventionally cored, peeled and sliced apples are indicated generally in box 26. The same sulphuring treatment is given as indicated in box 27. After the preservative and anti-oxidant surfacing has been accomplished with the sulphur bath treatment, the apples are transferred to the kiln 28 which, again, has the same vapor exhaust 29 and perforate floor 30 through which heated air 31 is forced. The dried product having the characteristic tough and case hardened cut flesh surface is indicated at box 32. This product may then be partially remoistened so as to absorb sulphur dioxide fumes and to impart a final preservative and anti-oxidant coating upon the conventional dried apple. This step is indicated by box 33, but may be omitted if the apples are to be immediately mechanically treated, in which case I have successfully used the kiln dried product at about a level of 22% moisture. The conventional dried apple which has been remoistened generally contains from 20% to 30% moisture and can serve as the initial product to be further processed after storage according to my invention. Here, again, the dried apples are run through mechanical compressing action such as provided by the rollers 34, and crushed while the outer case darkened or toughened surface layer is ruptured in the same discontinuous manner as heretofore described. This product is indicated at box 35 in Fig. 2. Since the moisture content of the piece is at a level where oxidation and enzymic browning occurs, the mechanically treated piece is again resulphured so as to preserve the newly exposed inner cellular structure. Because of the inner moisture brought to the surface by the mechanical treatment, it becomes possible to apply directly a sulphur dioxide vapor without moistening the apple. Thus, without increasing the moisture content, the treated apple piece may be a final commercial product as indicated by the box 37. As an alternate step, I may bring the resulphured pieces from the treatment of box 36 and pass the product back to the kiln 28 or to other suitable drying means. Here the resulphured pieces may be additionally dried before marketing. In the latter case, I prefer that the initial drying be carried out to maintain the apples at from 12% to 18% moisture content. The second drying process will then reduce the moisture content to below that of conventional dried apples and above that where the sulphur would be lost. I have found that a practical range lies between 10% and 20%. The two-stage drying process prevents formation of an unduly thick case hardened cut surface layer and increases the efficiency of the drying step. In any event, the final product has much the same appearance as the apple piece 21 illustrated in Fig. 3.

Where the commercial product of box 33 in Fig. 2 is not utilized in my process, I may take the dried product 32 and directly treat the pieces thereof in my mechanical means 34, then rely upon immediate treatment by the resulphuring of box 36 to preserve the mechanically treated product and, as previously noted, when this is done, sufficient moisture is squeezed outwardly of the dried apple product to form its own absorbing medium for the sulphur dioxide fumes. The overall efficiency of later drying operation is thus enhanced and the shipping weight of the ultimate product is reduced.

The resulting dried apple product 21, as shown in Fig. 3, has certain characteristics which are notably different from those of the conventional dried apple products. For example, rehydration is speeded up to the point where my treated apple piece can be merely placed in boiling water and almost completely rehydrated in the time which it takes the water to cool from boiling temperature down to room temperature. Despite the rather altered appearance of the apple piece 21 in dried form, it reacquired much of its original shape upon hydration. The compressed piece is considerably thinner than the piece in its conventionally dried form.

A particular utilization of my process which provides a new and novel apple product is obtained by feeding a mass of conventional apple pieces together into a roll mill wherein the rolls are large and rotate very closely together so that, in passing the apple pieces through, they are constantly under pressure against each other. As they are forced through the mill, the engendered pressure of layered apple pieces passing through the mill creates a creped surface appearance and crinkled configuration of the apple piece. By crinkled configuration I mean to include not only small surface irregularities but also compound curvatures of wavy character. The creped and cringled configurations are obtained largely on the interface between layered apple pieces and is, in addition to the discontinuous ruptures which are also produced in the aforementioned tough surface. The apple piece in its creped and crinkled condition has areas ranging from a very thin structure to a slightly thicker structure. The thinnest areas are such as to barely hold the apple together, yet having an appearance of greater than actual thickness. Besides being attractive to the eye, new and novel in appearance, my apple product provides additional features. Both rehydration and dehydration are improved because moisture passes laterally through the increased surface area in a multiplicity of directions. Also to be noted is that fact that the rough exterior surface created by the herein disclosed pressing action provides resistance in the piece structure of the apple to settling in moist food masses when it is incorporated therein. It further aids the piece structure in rising with the levening action of baked goods during baking. The edges of the tough surface layer adjacent the discontinuous ruptures are jagged in character and assists in the suspensibility of each particle. The compound curvature and crinkled configuration serve to entrap or temporarily delay the rising of bubbles in the fluid mass and the particle will be carried upwardly or delayed in its downward travel, even though the particle has a density greater than the fluid mass.

It should be particularly observed that the increased rehydration factor of this apple piece structure is important both in rehydrating apples in terms of being cooked or subjected to water and it is also important in providing an apple product that will, for practical purposes, rehydrate to a desired degree during baking in baked goods or when mixed with a high moisture content food product as, for example, gelatin, custard desserts, or ice cream.

Another important feature of this invention is the ability of a number of types, varieties and qualities of apples to be blended or intermixed at will and still be capable of almost immediate hydration to produce a uniform blend of apple product. The foregoing is in contrast to conventional dried apples in which the rate of rehydration varies to a great degree from one apple to the next. Some of the factors which influence the rate of rehydration of a conventional dried apple are the variety of apple, the period of season, the rate of dehydration of the dried apple, storage conditions, grade and quality of the apples, geographic area of origin, and climatic conditions under which the apples were grown. It may be readily perceived that, if a conventionally dried apple of one type requires four hours to rehydrate while a second requires one hour, and a third requires twenty-four hours, a mixture or blend of these types will result in a portion of the product becoming mushy while another part is still tough and hard. My improved dried apple product, on the other hand, is capable of hydration in a matter of minutes irrespective of the type, variety and grade of apple. For this reason, blends of apples may be standardized and still have uniform and consistent hydration periods.

It is to be understood that I am not limited to any particular size of conventional apple piece in practicing my invention. As starting material, I have successfully employed dried conventional apple products subdivided into quarter chunks, ring slices, diced pieces and even comminuted particles of conventional dried apples. The common features of all these products, however, lie in the reduced moisture content and the treatment with preservative and anti-oxidant which necessarily produces the aforementioned moisture resistant skin surfaces.

It may thus be seen that I have produced a new and unusual apple piece characterized by its ready ability to dehydrate and rehydrate and by its capability of remaining properly dispersed and suspended in other food products with which it may be incorporated, my apple particle further having improved flavor, aroma, color, texture and general appearance.

What I claim is:

1. A process for making a dried apple product, capable of ready hydration, from a conventionally sulphured dried apple piece having a moisture resistant tough outer surface over a cellular body, which process consists in compressing the entire piece to the extent of at least partially crushing the inner cellular structure, and rupturing discontinuously the surface to expose the cellular body and then drying the apple piece to a lower moisture content.

2. A process for making a dried apple product, capable of ready hydration, from a conventionally sulphured dried apple piece having a moisture resistant tough outer surface formed over a cellular body, which process consists in compressing and partially crushing the cellular body structure, and rupturing the tough outer surface discontinuously and exposing surface areas of the inner cellular body, and then resulphuring the compressed and ruptured piece.

3. A process for improving the suspensibility of a conventionally dried apple piece within a food mass in a fluid state, which process consists in compressing a conventional sulphured dried apple piece having a moisture resistant tough surface formed over an inner cellular body until the area of said apple piece becomes considerably expanded and until the inner cellular structure is crushed, simultaneously crinkling the compressed piece and rupturing discontinuously the tough surface, thereby exposing areas of the inner cellular body, then drying while preserving the compressed and crinkled configuration.

4. A process for improving the suspensibility of conventional dried apple particles within a food mass in a fluid state, which process consists in compressing in layered relation a plurality of conventional sulphured dried apple pieces having moisture resistant skin surfaces formed over cellular inner bodies to an extent to crush the said cellular inner bodies and thereby expanding the total area of each of the pieces, simultaneously imparting a creped interface between contacting layers of pieces, and simultaneously rupturing discontinuously the skin surfaces of the layered pieces and thereby exposing areas of the inner cellular bodies, then drying and separating the pieces while preserving the creped configuration thereon.

5. A process for making a dried apple product capable of ready hydration, from a conventionally dried apple piece, said apple piece being previously preservatively treated with an anti-oxidant and having a moisture resistant tough layer formed over a cellular body which process consists in positively compressing the entire piece to expand the surface area thereof and to crush the inner cellular structure thereof, randomly tearing the tough layer and exposing portions of the inner flesh of the cellular body, again subjecting said apple piece to a preservative-treatment with an anti-oxidant, and drying the product to a lower moisture content.

6. A process for making dried apple particles capable of ready hydration, which consists in coating an apple piece in freshly cut condition with an anti-oxidant, drying the piece to a moisture level below 35% of the weight of the dried piece and thereby permitting the formation of a moisture resistant tough layer, then through the step-medium of cooperating flattening rollers, forcibly compressing the thickness of the piece to crush the inner cellular structure thereof, rupturing the outer surface of the comminuted dried particles, and then further drying the particles.

References Cited in the file of this patent
UNITED STATES PATENTS

| | | |
|---|---|---|
| 1,062,969 | Harrison | May 27, 1913 |
| 1,272,266 | Horn | July 9, 1918 |
| 1,411,479 | Cloud | Apr. 4, 1922 |
| 2,452,983 | Birdseye | Nov. 2, 1948 |
| 2,541,859 | Callaghan et al. | Feb. 13, 1951 |

UNITED STATES PATENT OFFICE
CERTIFICATE OF CORRECTION

Patent No. 2,901,359                                  August 25, 1959

John H. Forkner

It is hereby certified that error appears in the printed specification of the above numbered patent requiring correction and that the said Letters Patent should read as corrected below.

Column 5, line 2, for "case darkened" read -- case hardened --.

Signed and sealed this 16th day of February 1960.

(SEAL)
Attest:
KARL H. AXLINE
Attesting Officer

ROBERT C. WATSON
Commissioner of Patents